(12) United States Patent
Ho et al.

(10) Patent No.: US 8,537,123 B2
(45) Date of Patent: Sep. 17, 2013

(54) TOUCH SENSING APPARATUS AND SENSING SIGNAL PROCESSING METHOD THEREOF

(75) Inventors: Chen-Hsiang Ho, Hsin-Chu (TW); Yu-Min Hsu, Hsin-Chu (TW); Chih-Sung Wang, Hsin-Chu (TW)

(73) Assignee: AU Optronics Corp., Hsin-Chu (TW)

( * ) Notice: Subject to any disclaimer, the term of this patent is extended or adjusted under 35 U.S.C. 154(b) by 1168 days.

(21) Appl. No.: 12/258,457

(22) Filed: Oct. 27, 2008

(65) Prior Publication Data
US 2010/0039396 A1 Feb. 18, 2010

(30) Foreign Application Priority Data
Aug. 15, 2008 (TW) .............................. 97131083 A

(51) Int. Cl.
*G06F 3/041* (2006.01)
(52) U.S. Cl.
USPC ........................................ 345/173; 345/178
(58) Field of Classification Search
USPC ............... 345/55, 154–178, 667; 178/18.03, 178/198.01; 715/702, 784, 234, 800, 252, 715/251; 340/635, 662, 604, 573.5, 540, 340/429, 566
See application file for complete search history.

(56) References Cited

U.S. PATENT DOCUMENTS

| | | | | |
|---|---|---|---|---|
| 5,635,958 A * | 6/1997 | Murai et al. | .................... | 345/168 |
| 5,764,223 A * | 6/1998 | Chang et al. | .................... | 345/175 |
| 5,861,583 A * | 1/1999 | Schediwy et al. | .......... | 178/18.06 |
| 6,037,929 A * | 3/2000 | Ogura et al. | ................... | 345/168 |
| 6,188,391 B1 * | 2/2001 | Seely et al. | .................... | 345/173 |
| 6,346,935 B1 * | 2/2002 | Nakajima et al. | ............. | 345/173 |
| 6,359,616 B1 * | 3/2002 | Ogura et al. | ................... | 345/173 |
| 7,170,017 B2 | 1/2007 | Chiang | | |
| 7,511,702 B2 * | 3/2009 | Hotelling | ........................ | 345/173 |
| 8,134,535 B2 * | 3/2012 | Choi et al. | ..................... | 345/173 |
| 2006/0092143 A1 | 5/2006 | Kasai et al. | | |
| 2006/0256093 A1 * | 11/2006 | Furukawa et al. | ............. | 345/173 |
| 2007/0018967 A1 * | 1/2007 | Wang et al. | .................... | 345/173 |
| 2007/0063991 A1 * | 3/2007 | Lee et al. | ...................... | 345/173 |
| 2007/0182719 A1 * | 8/2007 | Lee et al. | ....................... | 345/173 |
| 2007/0236466 A1 * | 10/2007 | Hotelling | ....................... | 345/173 |
| 2008/0143688 A1 * | 6/2008 | Cho | ............................... | 345/173 |
| 2008/0157893 A1 * | 7/2008 | Krah | ........................... | 331/177 R |
| 2008/0259053 A1 * | 10/2008 | Newton | ......................... | 345/175 |
| 2009/0058826 A1 * | 3/2009 | Lee et al. | ....................... | 345/173 |

(Continued)

FOREIGN PATENT DOCUMENTS

JP 63247819 10/1988
TW 201007523 2/2010

*Primary Examiner* — Prabodh M Dharia
(74) *Attorney, Agent, or Firm* — Winston Hsu; Scott Margo

(57) ABSTRACT

A touch sensing apparatus for accelerating a sensing signal processing operation is provided. The touch sensing apparatus includes a plurality of sets of horizontal sensing lines, a plurality of sets of vertical sensing lines, a plurality of processing circuits, and a plurality of sensing units. The plurality of sensing units output a plurality of sets of horizontal and vertical sensing signals via the plurality of sets of horizontal and vertical sensing lines respectively. Each processing circuit is coupled to corresponding sets of horizontal and vertical sensing lines. Furthermore, disclosed is a sensing signal processing method essentially including scanning the plurality of sets of horizontal sensing lines in synchronization for synchronously fetching the plurality of sets of horizontal sensing signals during a first interval, and scanning the plurality of sets of vertical sensing lines in synchronization for synchronously fetching the plurality of sets of vertical sensing signals during a second interval.

12 Claims, 7 Drawing Sheets

(56) References Cited

U.S. PATENT DOCUMENTS

| | | | |
|---|---|---|---|
| 2009/0085894 A1* | 4/2009 | Gandhi et al. | 345/175 |
| 2009/0146970 A1* | 6/2009 | Lowles et al. | 345/174 |
| 2009/0167718 A1* | 7/2009 | Lee et al. | 345/174 |
| 2009/0273571 A1* | 11/2009 | Bowens | 345/173 |
| 2010/0039396 A1 | 2/2010 | Ho | |

\* cited by examiner

TOUCH SENSING APPARATUS AND SENSING SIGNAL PROCESSING METHOD THEREOF

BACKGROUND OF THE INVENTION

1. Field of the Invention

The present invention relates to a touch sensing apparatus and sensing signal processing method thereof, and more particularly, to a touch sensing apparatus and sensing signal processing method thereof for accelerating a sensing signal processing operation.

2. Description of the Prior Art

Along with the requirement of a friendly communication interface for a user to interact with an electronic device, a touch panel for controlling operations of the electronic device by directly touching the panel with fingers, instead of using a keyboard or a mouse, has gained popularity. In general, the touch panels are primarily classified into the resistive touch panels and the capacitive touch panels. The resistive touch panel positions a touched position according to related voltage drops changing in response to the touched position. The capacitive touch panel normally comprises a plurality of sensing capacitors, and the touched position can be positioned by analyzing the changing of capacitance of the sensing capacitor corresponding to the touched position.

FIG. 1 is a structural diagram schematically showing a prior-art touch sensing apparatus. As shown in FIG. 1, the touch sensing apparatus 100 comprises a first processing circuit 110, a second processing circuit 120, a sensing panel 130, a first transmission interface 140, a second transmission interface 150, a plurality of horizontal sensing lines 115, a plurality of vertical sensing lines 125, and a plurality of sensing units 135. The horizontal sensing lines 115, the vertical sensing lines 125 and the sensing units 135 are disposed on the sensing panel 130. Each sensing unit 135 is utilized for outputting one horizontal sensing signal and one vertical sensing signal responsive to touch events. Each horizontal sensing signal is forwarded to the first processing circuit 110 via one corresponding horizontal sensing line 115. Each vertical sensing signal is forwarded to the second processing circuit 120 via one corresponding vertical sensing line 125. The vertical sensing signals are transmitted to the first processing circuit 110 via the first transmission interface 140 after undergoing a preliminary signal operation performed by the second processing circuit 120. The first processing circuit 110 generates a touch coordinate signal by analyzing the horizontal sensing signals and the vertical sensing signals. The second transmission interface 150 is employed to transmit the touch coordinate signal to a host 180 so that the host 180 is able to control image-related operations on a display panel 190.

FIG. 2 is a timing diagram schematically showing the scanning times regarding the sensing signal processing operation of the touch sensing apparatus in FIG. 1, having time along the abscissa. The scanning times in FIG. 2, from top to bottom, are the scanning time of the first processing circuit and the scanning time of the second processing circuit. As shown in FIG. 2, when the touch sensing apparatus 100 performs the sensing signal processing operation, the first processing circuit 110 is enabled for starting the scanning process regarding the horizontal sensing lines 115 during the first preliminary scanning buffer time Tb1. After the first preliminary scanning buffer time Tb1, the first processing circuit 110 performs the scanning process over the horizontal sensing lines 115 for fetching the horizontal sensing signals during the horizontal scanning time Tx.

After the horizontal scanning time Tx, the second processing circuit 120 is enabled for starting the scanning process regarding the vertical sensing lines 125 during the second preliminary scanning buffer time Tb2. After the second preliminary scanning buffer time Tb2, the second processing circuit 120 performs the scanning process over the vertical sensing lines 125 for fetching the vertical sensing signals during the vertical scanning time Ty. After the vertical scanning time Ty, the first processing circuit 110 performs an analysis on the horizontal sensing signals and the vertical sensing signals for generating a touch coordinate signal during the signal processing time Tp. The aforementioned sensing signal processing operation from the first preliminary scanning buffer time Tb1 to the signal processing time Tp is repeated periodically for continuously updating the touch coordinate signal.

It is noted that the second processing circuit 120 is idle while the first processing circuit 110 is scanning over the horizontal sensing lines 115, and the first processing circuit 110 is idle while the second processing circuit 120 is scanning over the vertical sensing lines 125. Furthermore, after the scanning process of the first processing circuit 110 is finished, the second preliminary scanning buffer time Tb2 is required to enable the second processing circuit 120 for starting the scanning process regarding the vertical sensing lines 125. Accordingly, regarding the low-efficiency sensing signal processing operation of the prior-art touch sensing apparatus, the operating speed of the scanning processes for fetching sensing signals is hard to boost in that the scanning times are difficult to be shortened. That is, based on the low-speed sensing signal processing operation, the touch coordinate signal cannot be updated in a real time, and parts of the touch data will be lost. In particular, while tracking a touch trajectory over a fast-changing touch event, trace errors are likely to occur due to the loss of parts of the touch data.

SUMMARY OF THE INVENTION

In accordance with an embodiment of the present invention, a touch sensing apparatus for accelerating a sensing signal processing operation is provided. The touch sensing apparatus comprises a first set of horizontal sensing lines, a second set of horizontal sensing lines, a first set of vertical sensing lines, a second set of vertical sensing lines, a first processing circuit, a second processing circuit, and a plurality of sensing units.

The first set of horizontal sensing lines is utilized for outputting a first set of horizontal sensing signals. The second set of horizontal sensing lines is utilized for outputting a second set of horizontal sensing signals. The first set of vertical sensing lines is utilized for outputting a first set of vertical sensing signals. The second set of vertical sensing lines is utilized for outputting a second set of vertical sensing signals. The first processing circuit is electrically coupled to the first set of horizontal sensing lines and the first set of vertical sensing lines for receiving the first set of horizontal sensing signals and the first set of vertical sensing signals respectively. The second processing circuit is electrically coupled to the second set of horizontal sensing lines and the second set of vertical sensing lines for receiving the second set of horizontal sensing signals and the second set of vertical sensing signals respectively. Each of the sensing units is electrically coupled to a corresponding horizontal sensing line and a corresponding vertical sensing line. Each of the sensing units functions to generate a corresponding horizontal sensing signal and a corresponding vertical sensing signal. The corresponding horizontal sensing line is included in the first set of horizontal sensing lines or the second set of horizontal sensing lines. The corresponding vertical sensing line is included in the first set of vertical sensing lines or the second set of vertical sensing lines.

The present invention further provides a sensing signal processing method for use in a touch sensing apparatus. The touch sensing apparatus comprises a plurality of sets of horizontal sensing lines and a plurality of sets of vertical sensing lines. The sensing signal processing method comprises: scanning a first set of horizontal sensing lines of the sets of horizontal sensing lines for fetching a first set of horizontal sensing signals during a first interval; scanning a second set of horizontal sensing lines of the sets of horizontal sensing lines for fetching a second set of horizontal sensing signals during the first interval; scanning a first set of vertical sensing lines of the sets of vertical sensing lines for fetching a first set of vertical sensing signals during a second interval; and scanning a second set of vertical sensing lines of the sets of vertical sensing lines for fetching a second set of vertical sensing signals during the second interval.

These and other objectives of the present invention will no doubt become obvious to those of ordinary skill in the art after reading the following detailed description of the preferred embodiment that is illustrated in the various figures and drawings.

DETAILED DESCRIPTION

Hereinafter, preferred embodiments of the present invention will be described in detail with reference to the accompanying drawings. Here, it is to be noted that the present invention is not limited thereto. Furthermore, the step serial numbers concerning the sensing signal processing method are not meant thereto limit the operating sequence, and any rearrangement of the operating sequence for achieving same functionality is still within the spirit and scope of the invention.

Figure 1:
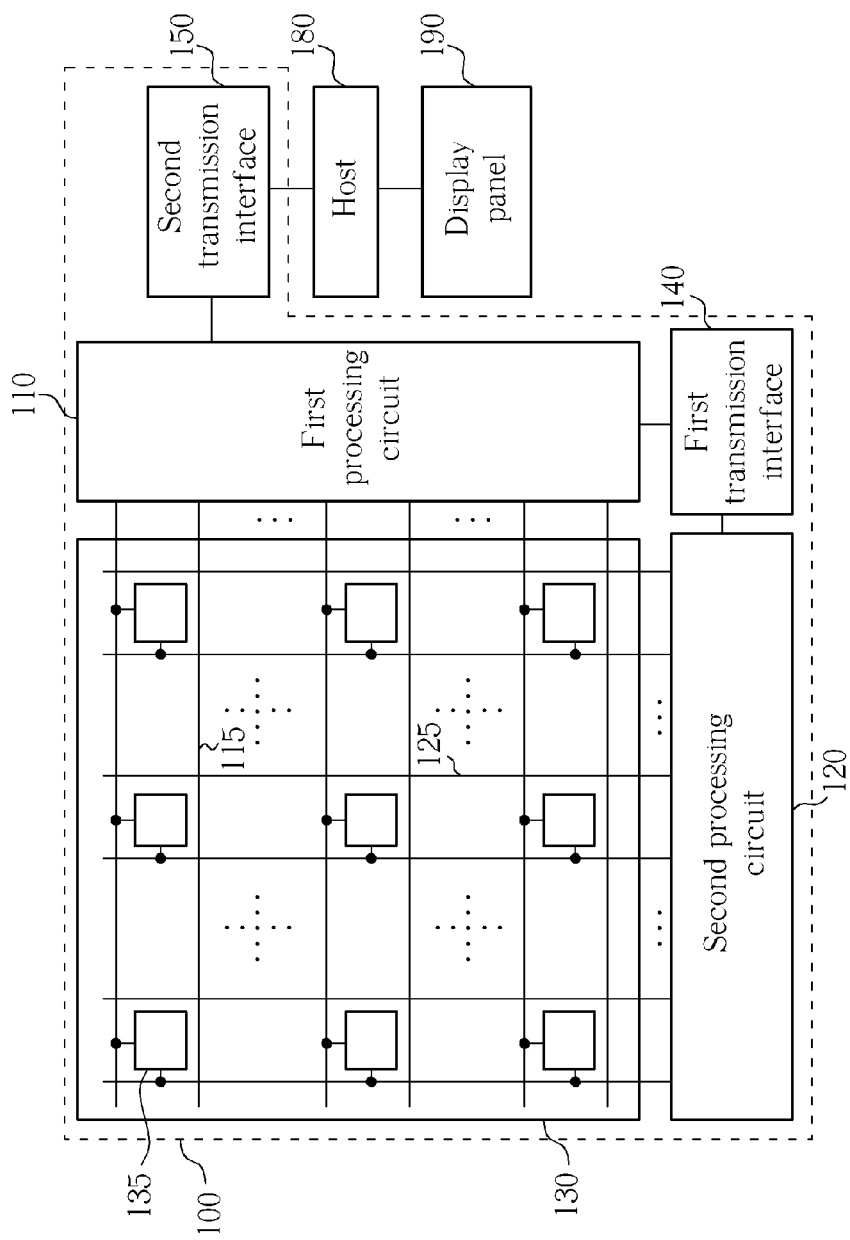
FIG. 1 is a structural diagram schematically showing a prior-art touch sensing apparatus.
Figure 2:
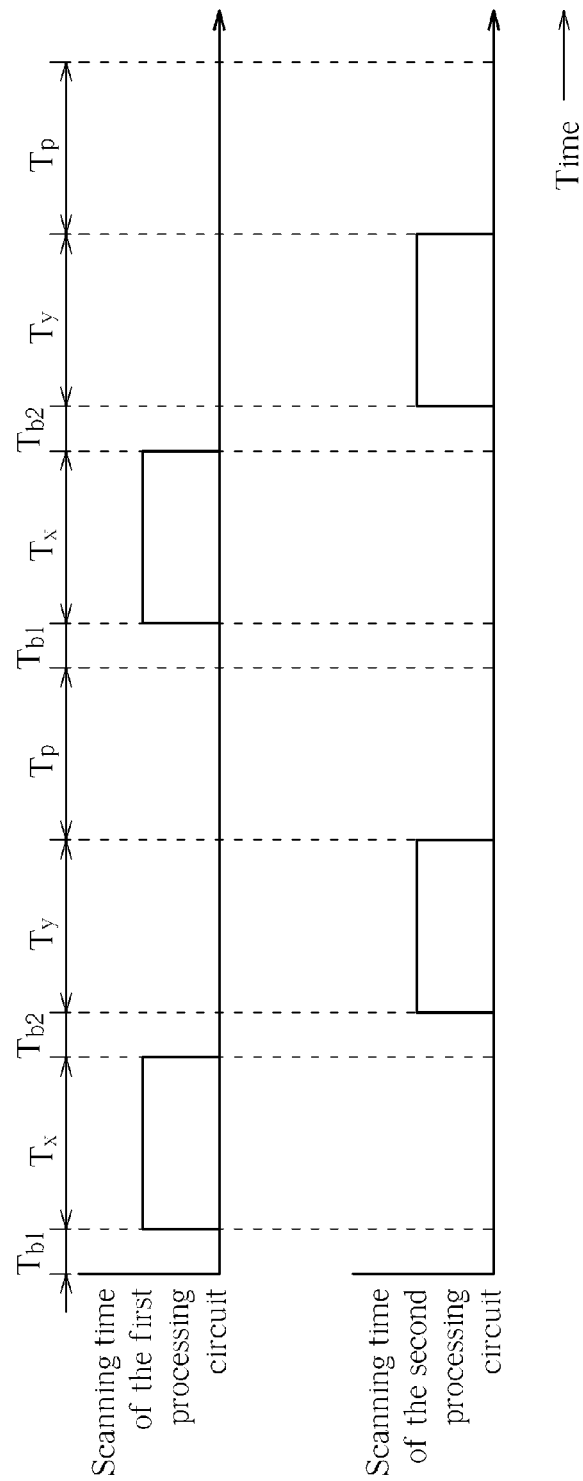
FIG. 2 is a timing diagram schematically showing the scanning times regarding the sensing signal processing operation of the touch sensing apparatus in FIG. 1, having time along the abscissa.
Figure 3:
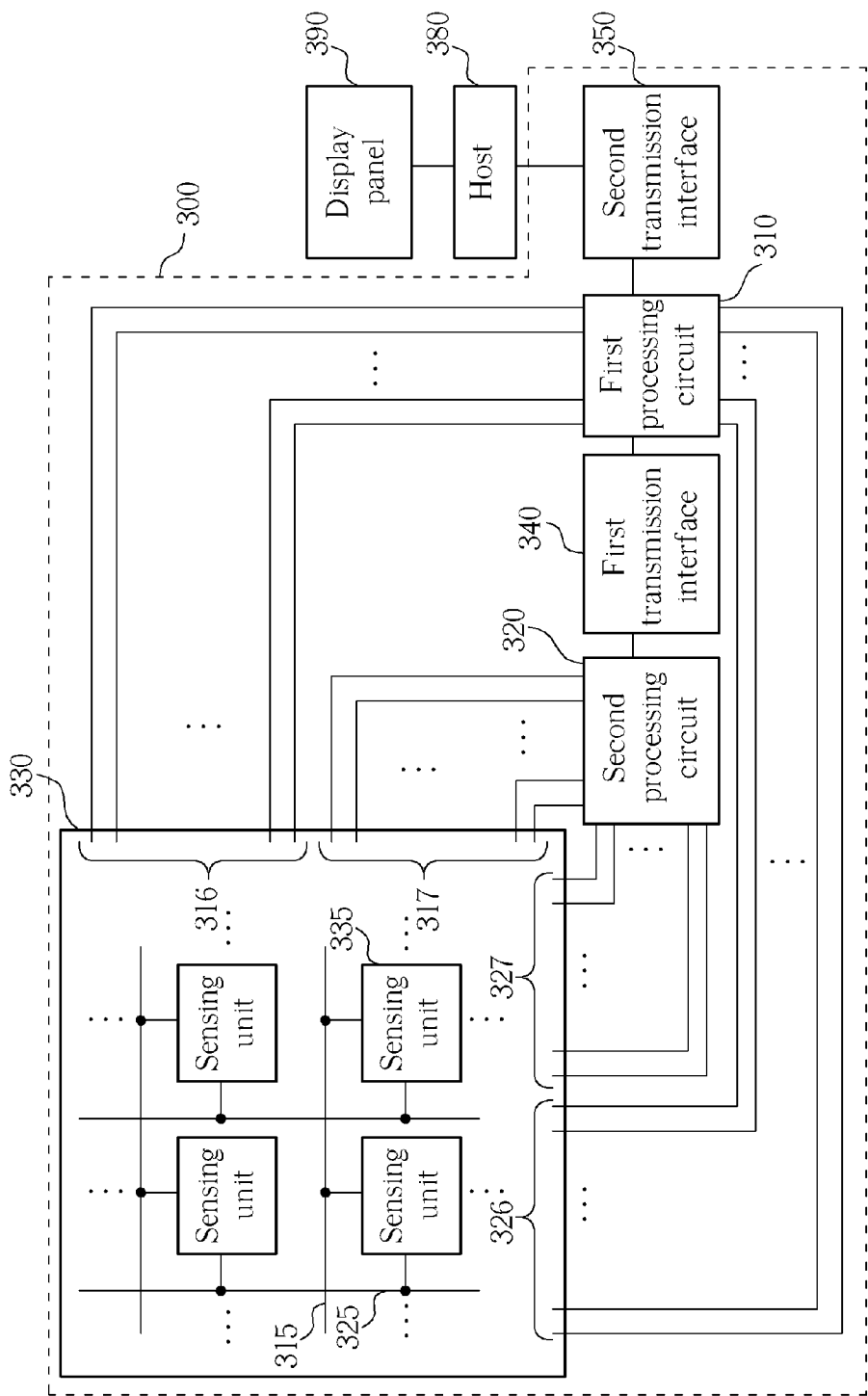
FIG. 3 is a structural diagram schematically showing a touch sensing apparatus in accordance with a first embodiment of the present invention.

FIG. 3 is a structural diagram schematically showing a touch sensing apparatus in accordance with a first embodiment of the present invention. As shown in FIG. 3, the touch sensing apparatus 300 comprises a first processing circuit 310, a second processing circuit 320, a sensing panel 330, a first transmission interface 340, a second transmission interface 350, a plurality of horizontal sensing lines 315, a plurality of vertical sensing lines 325, and a plurality of sensing units 335. The horizontal sensing lines 315, the vertical sensing lines 325, and the sensing units 335 are disposed on the sensing panel 330. Each sensing unit 335 is coupled to one corresponding horizontal sensing line 315 and one corresponding vertical line 325 for outputting horizontal and vertical sensing signals generated. The sensing units 335 comprise pressure sensing devices or light sensing devices. The pressure sensing devices are capacitive pressure sensing devices or piezoelectric devices. The light sensing devices are photo-diodes or photo-transistors. The horizontal sensing lines 315 comprise a first set of horizontal sensing lines 316 and a second set of horizontal sensing lines 317. The vertical sensing lines 325 comprise a first set of vertical sensing lines 326 and a second set of vertical sensing lines 327.

The first processing circuit 310 is coupled to the first set of horizontal sensing lines 316 for receiving a first set of horizontal sensing signals. Also, the first processing circuit 310 is coupled to the first set of vertical sensing lines 326 for receiving a first set of vertical sensing signals. The second processing circuit 320 is coupled to the second set of horizontal sensing lines 317 for receiving a second set of horizontal sensing signals. Also, the second processing circuit 320 is coupled to the second set of vertical sensing lines 327 for receiving a second set of vertical sensing signals. The first transmission interface 340 is coupled between the first processing circuit 310 and the second processing circuit 320. The second sets of horizontal and vertical sensing signals are transmitted to the first processing circuit 310 via the first transmission interface 340 after undergoing a preliminary signal operation performed by the second processing circuit 320. The second transmission interface 350 is coupled to the first processing circuit 310. The first processing circuit 310 generates a touch coordinate signal by analyzing the first set of horizontal sensing signals, the second set of horizontal sensing signals, the first set of vertical sensing signals, and the second set of vertical sensing signals. The second transmission interface 350 is employed to transmit the touch coordinate signal to a host 380 so that the host 380 is able to control image-related operations on a display panel 390.

In another embodiment, the second transmission interface 350 is coupled to the second processing circuit 320, and the first transmission interface 340 is utilized for transmitting the first sets of horizontal and vertical sensing signals from the first processing circuit 310 to the second processing circuit 320. The second processing circuit 320 is employed to generate the touch coordinate signal by analyzing the first set of horizontal sensing signals, the second set of horizontal sensing signals, the first set of vertical sensing signals, and the second set of vertical sensing signals. The second transmission interface 350 functions to transmit the touch coordinate signal to the host 380 so that the host 380 is able to control image-related operations on the display panel 390.

Figure 4:
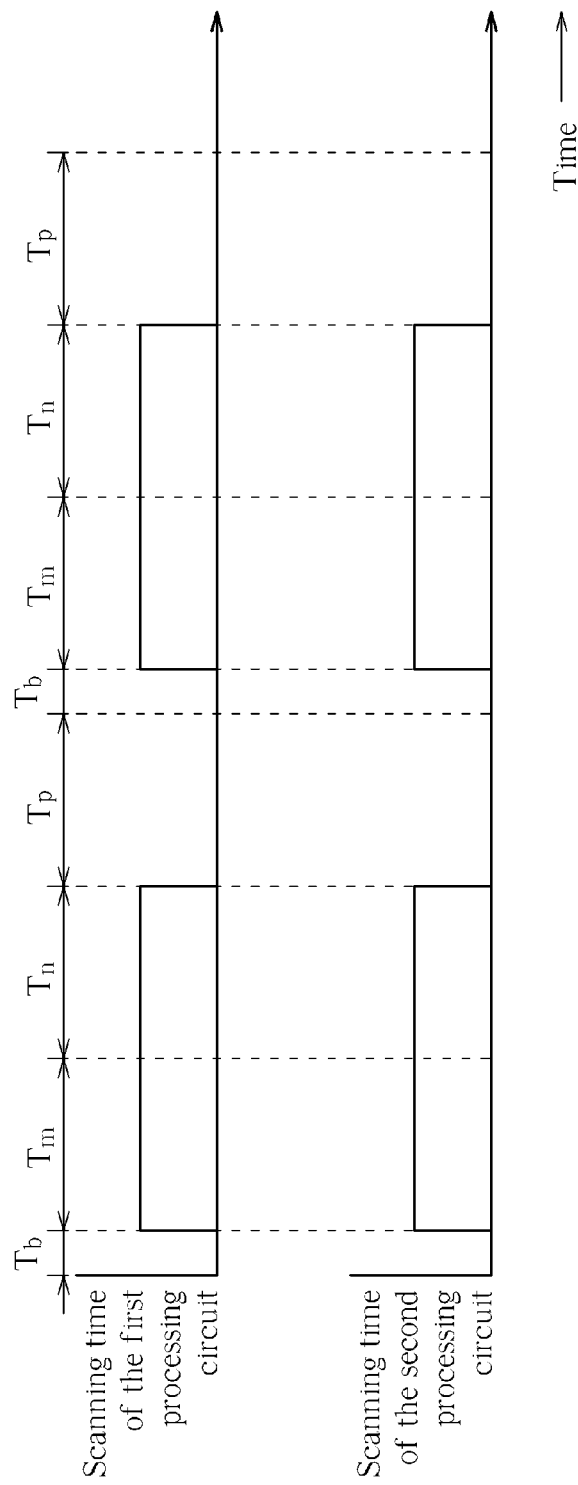
FIG. 4 is a timing diagram schematically showing the scanning times regarding the sensing signal processing operation of the touch sensing apparatus in FIG. 3, having time along the abscissa.

FIG. 4 is a timing diagram schematically showing the scanning times regarding the sensing signal processing operation of the touch sensing apparatus in FIG. 3, having time along the abscissa. The scanning times in FIG. 4, from top to bottom, are the scanning time of the first processing circuit and the scanning time of the second processing circuit. As shown in FIG. 4, when the touch sensing apparatus 300 performs the sensing signal processing operation during the preliminary scanning buffer time Tb, the first processing circuit 310 is enabled for starting the scanning process regarding the first set of horizontal sensing lines 316; meanwhile, the second processing circuit 320 is enabled for starting the scanning process regarding the second set of horizontal sensing lines 317.

After the preliminary scanning buffer time Tb, the first processing circuit 310 performs the scanning process over the first set of horizontal sensing lines 316 for fetching the first set of horizontal sensing signals during the horizontal scanning time Tm; meanwhile, the second processing circuit 320 performs the scanning process over the second set of horizontal sensing lines 317 for fetching the second set of horizontal sensing signals. That is, the first processing circuit 310 and the second processing circuit 320 perform the scanning processes respectively over the first set of horizontal sensing lines 316 and the second set of horizontal sensing lines 317 in synchronization for synchronously fetching the first and second sets of horizontal sensing signals.

After the horizontal scanning time Tm, the first processing circuit 310 performs the scanning process over the first set of vertical sensing lines 326 for fetching the first set of vertical sensing signals during the vertical scanning time Tn; meanwhile, the second processing circuit 320 performs the scanning process over the second set of vertical sensing lines 327 for fetching the second set of vertical sensing signals. That is, the first processing circuit 310 and the second processing circuit 320 perform the scanning processes respectively over the first set of vertical sensing lines 326 and the second set of vertical sensing lines 327 in synchronization for synchronously fetching the first and second sets of vertical sensing signals. After the vertical scanning time Tn, the first processing circuit 310 performs an analysis on the first set of horizontal sensing signals, the second set of horizontal sensing signals, the first set of vertical sensing signals, and the second set of vertical sensing signals for generating a touch coordinate signal during the signal processing time Tp.

The aforementioned processes in the sensing signal processing operation of the touch sensing apparatus 300, i.e. from the preliminary scanning buffer time Tb to the signal processing time Tp, are repeated periodically for continuously updating the touch sensing signal, and the latest updated touch sensing signal is furnished to the host 380 in a real time. It is noted that no preliminary scanning buffer time is required between the horizontal scanning time Tn and the vertical scanning time Tm in that both the first processing circuit 310 and the second processing circuit 320 are enabled after the preliminary scanning buffer time Tb. Consequently, the scanning processes regarding the first set of vertical sensing lines 326 and the second set of vertical sensing lines 327 can be carried out immediately after finishing the scanning processes regarding the first set of horizontal sensing lines 316 and the second set of horizontal sensing lines 317. Besides, the horizontal scanning time Tm, required in the sensing signal processing operation of the touch sensing apparatus 300, is substantially about a half of the horizontal scanning time Tx required in the sensing signal processing operation of the prior-art touch sensing apparatus 100. Similarly, the vertical scanning time Tn, required in the sensing signal processing operation of the touch sensing apparatus 300, is substantially about a half of the vertical scanning time Ty required in the sensing signal processing operation of the prior-art touch sensing apparatus 100.

In another embodiment, if the horizontal and vertical sensing signals of the sensing unit 335 can be outputted simultaneously without mutual interference, the horizontal scanning time Tm and the vertical scanning time Tn can be overlapped between each other. That is, the scanning processes over the first set of horizontal sensing lines 316, the second set of horizontal sensing lines 317, the first set of vertical sensing lines 326 and the second set of vertical sensing lines 327 can be performed simultaneously for further reducing the time required for fetching all the horizontal and vertical sensing signals. In summary, the operating speed regarding the sensing signal processing operation of the touch sensing apparatus 300 can be boosted significantly for updating the touch sensing signal in a real time so that the host 380 is able to receive and process the latest updated touch sensing signal forthwith. That is, the touch sensing apparatus 300 is capable of fast fetching the touch data sufficiently for performing an accurate analysis over a fast-changing touch event.

Figure 5:
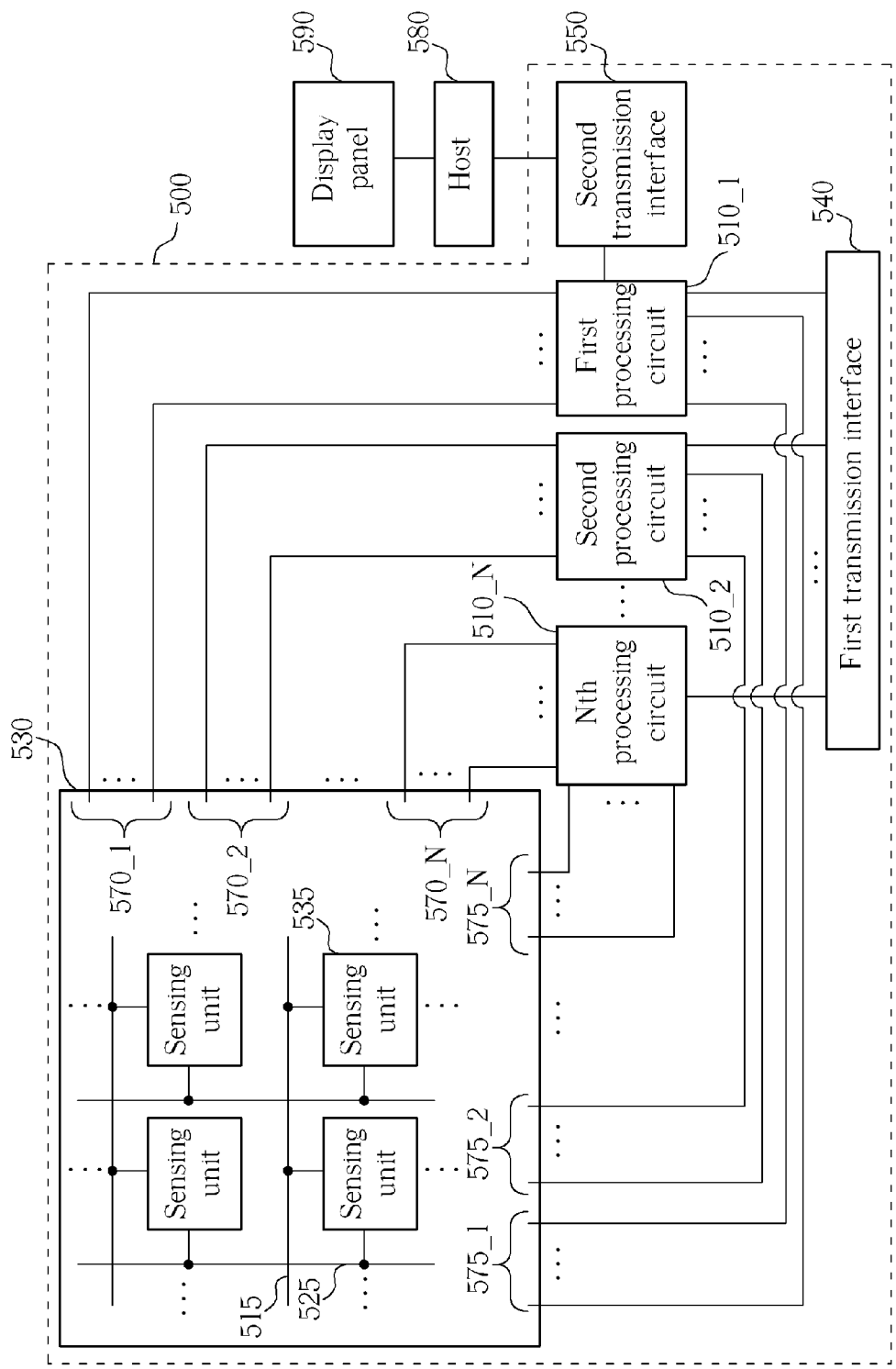
FIG. 5 is a structural diagram schematically showing a touch sensing apparatus in accordance with a second embodiment of the present invention.

FIG. 5 is a structural diagram schematically showing a touch sensing apparatus in accordance with a second embodiment of the present invention. As shown in FIG. 5, the touch sensing apparatus 500 comprises a plurality of processing circuit 510_1-510_N, a touch panel 530, a first transmission interface 540, a second transmission interface 550, a plurality of horizontal sensing lines 515, a plurality of vertical sensing lines 525, and a plurality of sensing units 535. The horizontal sensing lines 515, the vertical sensing lines 525 and the sensing units 535 are disposed on the sensing panel 530. Each sensing unit 535 is coupled to one corresponding horizontal sensing line 515 and one corresponding vertical line 525 for outputting horizontal and vertical sensing signals generated. The sensing units 535 comprise pressure sensing devices or light sensing devices. The pressure sensing devices are capacitive pressure sensing devices or piezoelectric devices. The light sensing devices are photo-diodes or photo-transistors. The horizontal sensing lines 515 comprise a first set of horizontal sensing lines 570_1 and a second set of horizontal sensing lines 570_2 through an Nth set of horizontal sensing lines 570_N. The vertical sensing lines 525 comprise a first set of vertical sensing lines 575_1 and a second set of vertical sensing lines 575_2 through an Nth set of vertical sensing lines 575_N.

The first processing circuit 510_1 is coupled to the first set of horizontal sensing lines 570_1 for receiving a first set of horizontal sensing signals. Also, the first processing circuit 510_1 is coupled to the first set of vertical sensing lines 575_1 for receiving a first set of vertical sensing signals. The second processing circuit 510_2 is coupled to the second set of horizontal sensing lines 570_2 for receiving a second set of horizontal sensing signals. Also, the second processing circuit 510_2 is coupled to the second set of vertical sensing lines 575_2 for receiving a second set of vertical sensing signals. The Nth processing circuit 510_N is coupled to the Nth set of horizontal sensing lines 570_N for receiving an Nth set of horizontal sensing signals. Also, the Nth processing circuit 510_N is coupled to the Nth set of vertical sensing lines 575_N for receiving an Nth set of vertical sensing signals. The couple relationships regarding other processing circuits can be inferred by analogy.

The first transmission interface 540 is coupled to the first processing circuit 510_1 through the Nth processing circuit 510_N. The second through Nth sets of horizontal and vertical sensing signals are transmitted to the first processing circuit 510_1 via the first transmission interface 540 after undergoing preliminary signal operations performed by the second processing circuit 510_2 through the Nth processing circuit 510_N respectively. The second transmission interface 550 is coupled to the first processing circuit 5101. The first processing circuit 510_1 generates a touch coordinate signal by analyzing the first through Nth sets of horizontal and vertical sensing signals. The second transmission interface 550 is employed to transmit the touch coordinate signal to a host 580 so that the host 580 is able to control image-related operations on a display panel 590.

In an alternative embodiment, the second transmission interface 550 is coupled to an Xth processing circuit 510_X. The number X is an integer between 1 and N. The second transmission interface 550 is utilized for transmitting a plurality of sets of horizontal and vertical sensing signals respectively from corresponding processing circuits to the Xth processing circuit 510_X except for the Xth sets of horizontal and vertical sensing signals. The Xth processing circuit 510_X is employed to generate the touch coordinate signal by analyzing the first through Nth sets of horizontal and vertical sensing signals. The second transmission interface 550 functions to transmit the touch coordinate signal to the host 580 so that the host 580 is able to control image-related operations on the display panel 590.

Figure 6:
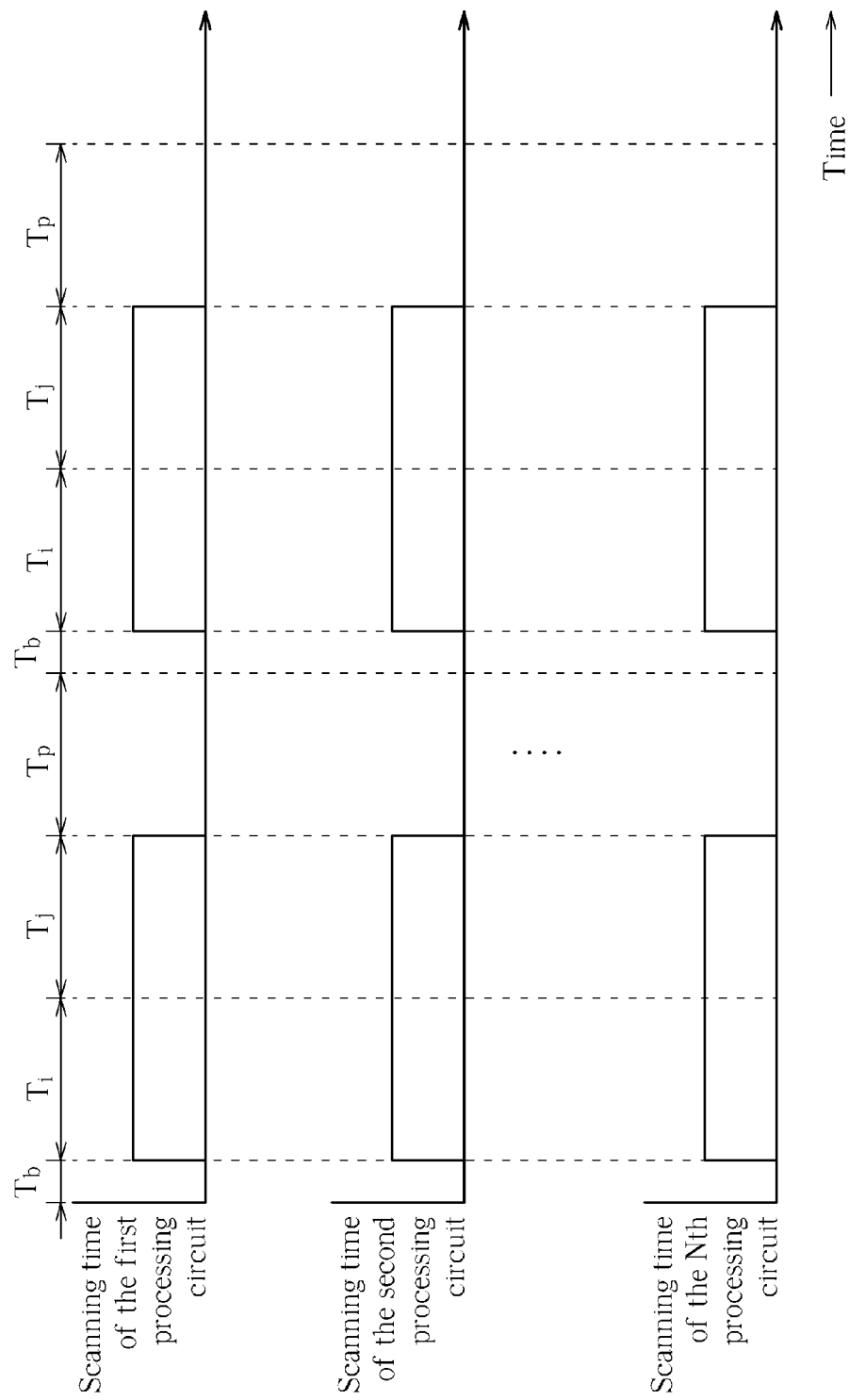
FIG. 6 is a timing diagram schematically showing the scanning times regarding the sensing signal processing operation of the touch sensing apparatus in FIG. 5, having time along the abscissa.

FIG. 6 is a timing diagram schematically showing the scanning times regarding the sensing signal processing operation of the touch sensing apparatus in FIG. 5, having time along the abscissa. The scanning times in FIG. 6, from top to bottom, are the scanning time of the first processing circuit 510_1, the scanning time of the second processing circuit 510_2, and the scanning time of the Nth processing circuit 510_N. The scanning times of other processing circuits can be inferred by analogy. As shown in FIG. 6, when the touch sensing apparatus 500 performs the sensing signal processing operation during the preliminary scanning buffer time Tb, the first processing circuit 510_1 is enabled for starting the scanning process regarding the first set of horizontal sensing lines 570_1; meanwhile, the second processing circuit 510_2 through the Nth processing circuit 510_N are enabled for starting the scanning processes regarding the second set of horizontal sensing lines 570_2 through the Nth set of horizontal sensing lines 570_N respectively.

After the preliminary scanning buffer time Tb, the first processing circuit 510_1 performs the scanning process over the first set of horizontal sensing lines 570_1 for fetching the first set of horizontal sensing signals during the horizontal scanning time Ti; meanwhile, the second processing circuit 510_2 through the Nth processing circuit 510_N perform the scanning processes over the second set of horizontal sensing lines 570_2 through the Nth set of horizontal sensing lines 570_N for fetching the second through Nth sets of horizontal sensing signals respectively. That is, the first processing circuit 510_1 through the Nth processing circuit 510_N perform the scanning processes over the first set of horizontal sensing lines 570_1 through the Nth set of horizontal sensing lines 570_N in synchronization for synchronously fetching the first through Nth sets of horizontal sensing signals.

After the horizontal scanning time Ti, the first processing circuit 510_1 performs the scanning process over the first set of vertical sensing lines 575_1 for fetching the first set of vertical sensing signals during the vertical scanning time Tj; meanwhile, the second processing circuit 510_2 through the Nth processing circuit 510_N perform the scanning processes over the second set of vertical sensing lines 575_2 through the Nth set of vertical sensing lines 575_N for fetching the second through Nth sets of vertical sensing signals respectively. That is, the first processing circuit 510_1 through the Nth processing circuit 510_N perform the scanning processes respectively over the first set of vertical sensing lines 575_1 through the Nth set of vertical sensing lines 575_N in synchronization for synchronously fetching the first through Nth sets of vertical sensing signals. After the vertical scanning time Tj, the first processing circuit 510_1 performs an analysis on the first through Nth sets of horizontal and vertical sensing signals for generating a touch coordinate signal during the signal processing time Tp.

The aforementioned processes in the sensing signal processing operation of the touch sensing apparatus 500, i.e. from the preliminary scanning buffer time Tb to the signal processing time Tp, are repeated periodically for continuously updating the touch sensing signal, and the latest updated touch sensing signal is furnished to the host 580 in a real time. It is noted that no preliminary scanning buffer time is required between the horizontal scanning time T1 and the vertical scanning time Tj in that all the first processing circuit 510_1 through the Nth processing circuit 510_N are enabled after the preliminary scanning buffer time Tb. Consequently, the scanning processes regarding the first set of vertical sensing lines 575_1 through the Nth set of vertical sensing lines 575_N can be carried out immediately after finishing the scanning processes regarding the first set of horizontal sensing lines 570_1 through the Nth set of horizontal sensing lines 570_N. Besides, the horizontal scanning time T1, required in the sensing signal processing operation of the touch sensing apparatus 500, is substantially about one Nth of the horizontal scanning time Tx required in the sensing signal processing operation of the prior-art touch sensing apparatus 100. Similarly, the vertical scanning time Tj, required in the sensing signal processing operation of the touch sensing apparatus 500, is substantially about one Nth of the vertical scanning time Ty required in the sensing signal processing operation of the prior-art touch sensing apparatus 100.

In another embodiment, if the horizontal and vertical sensing signals of the sensing unit 535 can be outputted simultaneously without mutual interference, the horizontal scanning time Ti and the vertical scanning time Tj can be overlapped between each other. That is, the scanning processes over the first set of horizontal sensing lines 570_1 through the Nth set of horizontal sensing lines 570_N and the first set of vertical sensing lines 575_1 through the Nth set of vertical sensing lines 575_N can be performed simultaneously for further reducing the time required for fetching all the horizontal and vertical sensing signals. In summary, the operating speed regarding the sensing signal processing operation of the touch sensing apparatus 500 can be boosted significantly for updating the touch sensing signal in a real time so that the host 580 is able to receive and process the latest updated touch sensing signal forthwith. That is, the touch sensing apparatus 500 is capable of fast fetching the touch data sufficiently for performing an accurate analysis over a fast-changing touch event.

Figure 7:
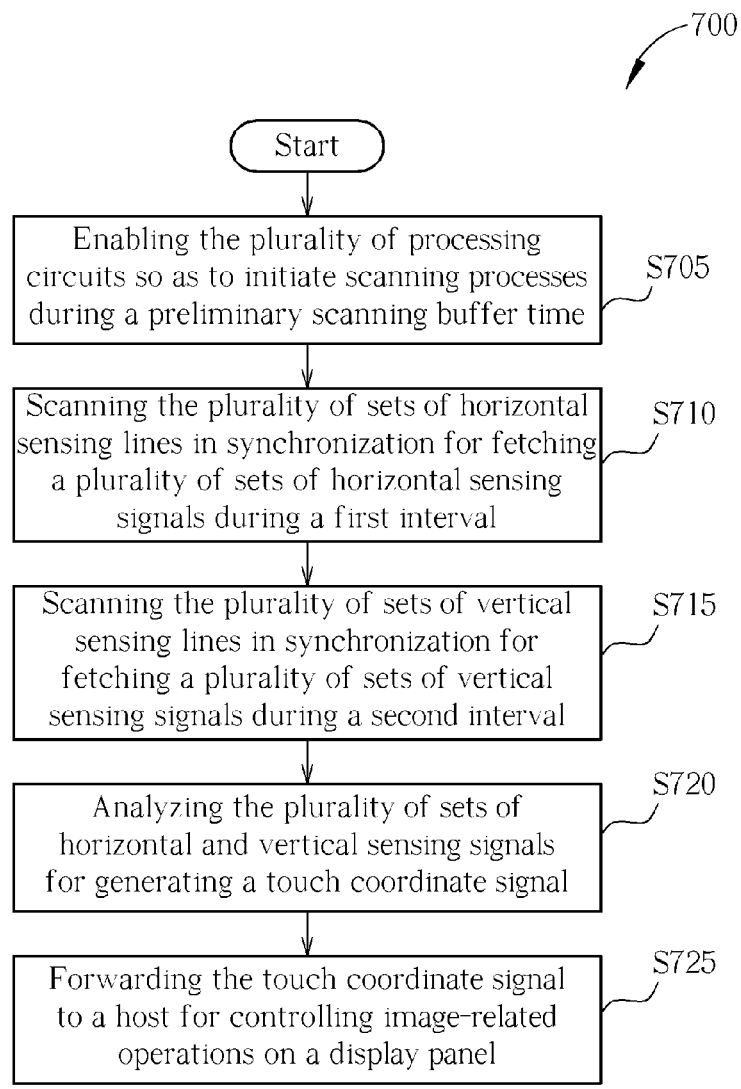
FIG. 7 is a flowchart depicting a sensing signal processing method for use in a touch sensing apparatus according to the present invention.

FIG. 7 is a flowchart depicting a sensing signal processing method for use in a touch sensing apparatus according to the present invention. The touch sensing apparatus comprises a plurality of sets of horizontal sensing lines, a plurality of sets of vertical sensing lines, and a plurality of processing circuits. As shown in FIG. 7, the sensing signal processing method 700 comprises the following steps:

Step S705: enabling the plurality of processing circuits so as to initiate scanning processes during a preliminary scanning buffer time;

Step S710: scanning the plurality of sets of horizontal sensing lines in synchronization for fetching a plurality of sets of horizontal sensing signals during a first interval;

Step S715: scanning the plurality of sets of vertical sensing lines in synchronization for fetching a plurality of sets of vertical sensing signals during a second interval;

Step S720: analyzing the plurality of sets of horizontal and vertical sensing signals for generating a touch coordinate signal; and Step S725: forwarding the touch coordinate signal to a host for controlling image-related operations on a display panel.

In the flow of the sensing signal processing method 700, if the processes for fetching the horizontal and vertical sensing signals cannot be processed simultaneously due to occurrence of mutual interference, the first interval and the second interval cannot be overlapped between each other. However, the timing sequence between the first interval and the second interval is exchangeable without having an effect on the working performance of the touch sensing apparatus. Because the scanning processes over the plurality of sets of horizontal sensing lines are carried out synchronously, the length of the first interval is required only for scanning a single set of horizontal sensing lines, instead of sequentially scanning all the horizontal sensing lines regarding the prior-art sensing signal processing operation. Accordingly, the length of the first interval for fetching all the horizontal sensing signals can be reduced significantly. Similarly, because the scanning processes over the plurality of sets of vertical sensing lines are carried out synchronously, the length of the second interval is required only for scanning a single set of vertical sensing lines, instead of sequentially scanning all the vertical sensing lines regarding the prior-art sensing signal processing operation. Accordingly, the length of the second interval for fetching all the vertical sensing signals can be reduced significantly.

In another embodiment, if the processes for fetching the horizontal and vertical sensing signals can be processed simultaneously without mutual interference, the first interval and the second interval can be overlapped between each other. That is, the scanning processes over the plurality of sets of horizontal and vertical sensing lines can be processed simultaneously for further reducing the time required for fetching all the horizontal and vertical sensing signals. In summary, the sensing signal processing method 700 of the present invention is able to significantly reduce the horizontal and vertical scanning times required for fetching the horizontal and vertical sensing signals. Therefore, the operating speed regarding the sensing signal processing operation of the touch sensing apparatus can be boosted significantly so that the host is able to receive and process the latest updated touch sensing signal forthwith. As a result, the sensing signal processing method 700 of the present invention is capable of fast fetching the touch data sufficiently for performing an accurate analysis over a fast-changing touch event.

To sum up, the touch sensing apparatus of the present invention makes use of a plurality of processing circuits together with a plurality of sets of horizontal and vertical sensing lines for performing the sensing signal processing operation. In the sensing signal processing method of the present invention, the scanning processes over the plurality of sets of horizontal sensing lines are performed in synchronization for synchronously fetching a plurality of sets of horizontal sensing signals during a horizontal scanning time, and the scanning processes over the plurality of sets of vertical sensing lines are also performed in synchronization for synchronously fetching a plurality of sets of vertical sensing signals during a vertical scanning time. Accordingly, both the horizontal and vertical scanning times can be reduced significantly. Furthermore, no preliminary scanning buffer time is required between the horizontal scanning time and the vertical scanning time, and therefore the time required for performing the sensing signal processing operation can be further reduced. As a result, the operating speed regarding the sensing signal processing operation can be boosted significantly based on the touch sensing apparatus and the sensing signal processing method of the present method.

The present invention is by no means limited to the embodiments as described above by referring to the accompanying drawings, which may be modified and altered in a variety of different ways without departing from the scope of the present invention. Thus, it should be understood by those skilled in the art that various modifications, combinations, sub-combinations and alternations might occur depending on design requirements and other factors insofar as they are within the scope of the appended claims or the equivalents thereof.

What is claimed is:

1. A touch sensing apparatus comprising:
   a plurality of horizontal sensing lines disposed in a first direction;
   a plurality of vertical sensing lines disposed in a second direction, wherein the plurality of horizontal sensing lines are divided into N sets of horizontal sensing lines, the plurality of vertical sensing lines are divided into N sets of vertical sensing lines, and the first direction is perpendicular to the second direction;
   a plurality of sensing units, each of the sensing units electrically coupled to a corresponding horizontal sensing line and a corresponding vertical sensing line, each of the sensing units being utilized for generating a corresponding horizontal sensing signal and a corresponding vertical sensing signal; and
   N sets of processing circuits, each processing circuit of the N sets of processing circuits electrically coupled to a corresponding set of horizontal sensing lines of the N sets of horizontal sensing lines and a corresponding set of vertical sensing lines of the N sets of vertical sensing lines;
   wherein each processing circuit of the N sets of processing circuits respectively fetches and processes a horizontal sensing signal from a horizontal sensing line of the corresponding set of horizontal sensing lines at a first instant simultaneously;
   wherein each processing circuit of the N sets of processing circuits respectively fetches and processes a vertical sensing signal from a vertical sensing line of the corresponding set of vertical sensing lines at a second instant simultaneously; and
   wherein the first instant is different from the second instant and each of the N sets of horizontal sensing lines and each of the N sets of vertical sensing lines respectively have corresponding horizontal sensing lines and corresponding vertical sensing lines simultaneously transmitting signals to each of the N sets of processing circuit for processing sensing signals.

2. The touch sensing apparatus of claim 1, wherein the sensing unit comprises a pressure sensing device or a light sensing device.

3. The touch sensing apparatus of claim 2, wherein the pressure sensing device is a capacitive pressure sensing device or a piezoelectric device.

4. The touch sensing apparatus of claim 2, wherein the light sensing device is a photo-diode or a photo-transistor.

5. The touch sensing apparatus of claim 1, further comprising:
   a first transmission interface electrically coupled to the N sets of processing circuits.

6. The touch sensing apparatus of claim 5, wherein the N sets of processing circuits generate at least one touch coordinate signal based on the horizontal sensing signals and the vertical sensing signals.

7. A sensing signal processing method for use in a touch sensing apparatus, the touch sensing apparatus comprising a plurality of processing circuits, a plurality of sets of horizontal sensing lines and a plurality of sets of vertical sensing lines, the sensing signal processing method comprising:

each processing circuit of the plurality of processing circuits respectively fetching and processing a horizontal sensing signal from a horizontal sensing line of a corresponding set of horizontal sensing lines at a first instant simultaneously; and each processing circuit of the plurality of processing circuits respectively fetching and processing a vertical sensing signal from a vertical sensing line of the corresponding set of vertical sensing lines at a second instant simultaneously;

wherein the first instant is different from the second instant.

8. The sensing signal processing method of claim 7, wherein the first interval and the second interval are not overlapped between each other, and the first interval is prior to the second interval.

9. The sensing signal processing method of claim 7, wherein the first interval and the second interval are not overlapped between each other, and the second interval is prior to the first interval.

10. The sensing signal processing method of claim 7, further comprising:

generating at least one touch coordinate signal based on the horizontal sensing signals and the vertical sensing signals.

11. The sensing signal processing method of claim 10, further comprising:

forwarding the at least one touch coordinate signal to a host.

12. The sensing signal processing method of claim 7, further comprising:

delaying a preliminary scanning buffer time prior to the first interval and the second interval.

\* \* \* \* \*